United States Patent [19]
Szilagyi

[11] 3,981,474
[45] Sept. 21, 1976

[54] MIRROR BRACKET ASSEMBLY

[75] Inventor: Jane M. Szilagyi, Center Valley, Pa.

[73] Assignee: Delbar Products, Inc., Perkasie, Pa.

[22] Filed: June 12, 1975

[21] Appl. No.: 586,335

[52] U.S. Cl. ............................................... 248/487
[51] Int. Cl.² ........................................... A47G 1/24
[58] Field of Search ............ 248/466, 467, 475–488; 296/84 B; 350/307

[56] References Cited
UNITED STATES PATENTS

| | | | |
|---|---|---|---|
| 2,128,187 | 8/1938 | Kondrath | 248/484 |
| 2,533,475 | 12/1950 | Koonter | 248/483 X |
| 3,603,555 | 9/1971 | Lohr | 248/481 |

FOREIGN PATENTS OR APPLICATIONS

| | | | |
|---|---|---|---|
| 659,645 | 3/1963 | Canada | 248/481 |
| 1,377,245 | 9/1964 | France | 350/307 |
| 1,240,429 | 5/1967 | Germany | 248/475 B |
| 1,218,810 | 6/1966 | Germany | 248/481 |
| 605,364 | 5/1960 | Italy | 248/475 B |
| 1,096,462 | 12/1967 | United Kingdom | 248/481 |
| 1,147,149 | 4/1969 | United Kingdom | 248/480 |

Primary Examiner—Lawrence J. Staab
Attorney, Agent, or Firm—Reising, Ethington, Barnard, Perry & Brooks

[57] ABSTRACT

An outside rear view mirror assembly adapted to be mounted to the body portion of a vehicle, said assembly comprising a mirror head, a support arm including first and second leg portions, and means for adjustably mounting the mirror head upon said first leg portion, a monolithic housing structure integrally associated with said vehicle body portion and projecting exteriorly therefrom, and bracket means mounted interiorly of said housing such that the second leg portion of said support arm projects through a housing opening and is secured to said bracket means.

6 Claims, 6 Drawing Figures

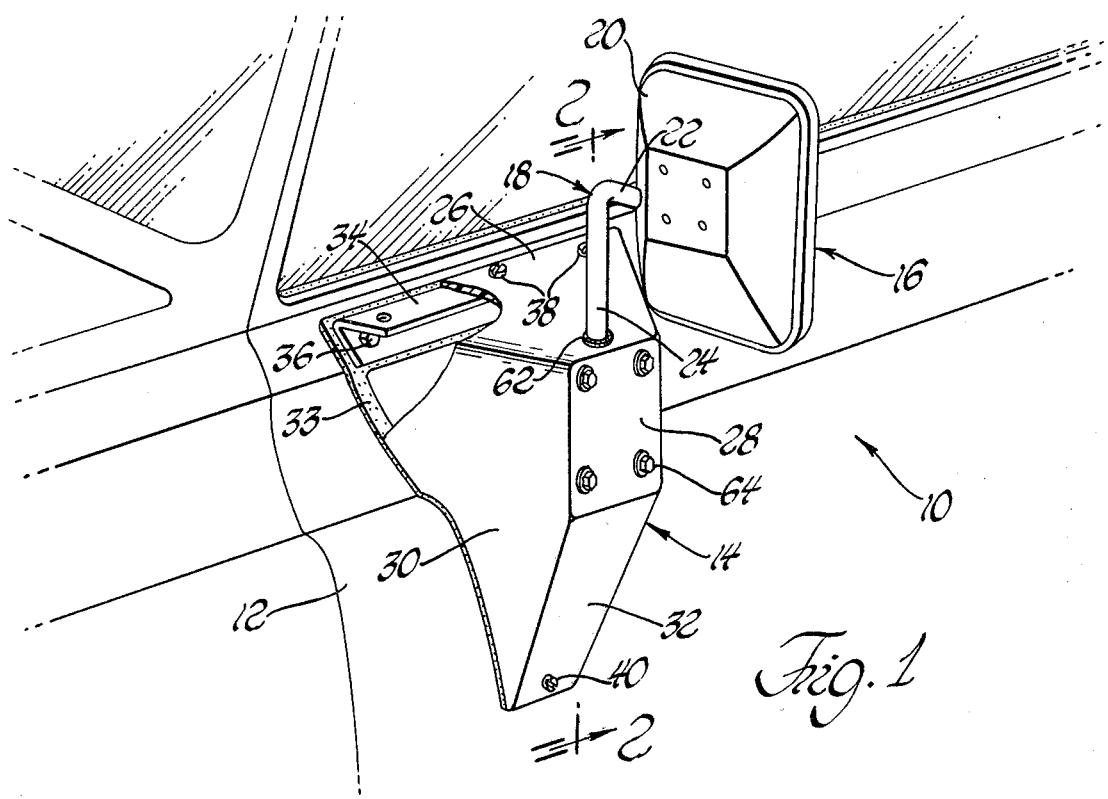
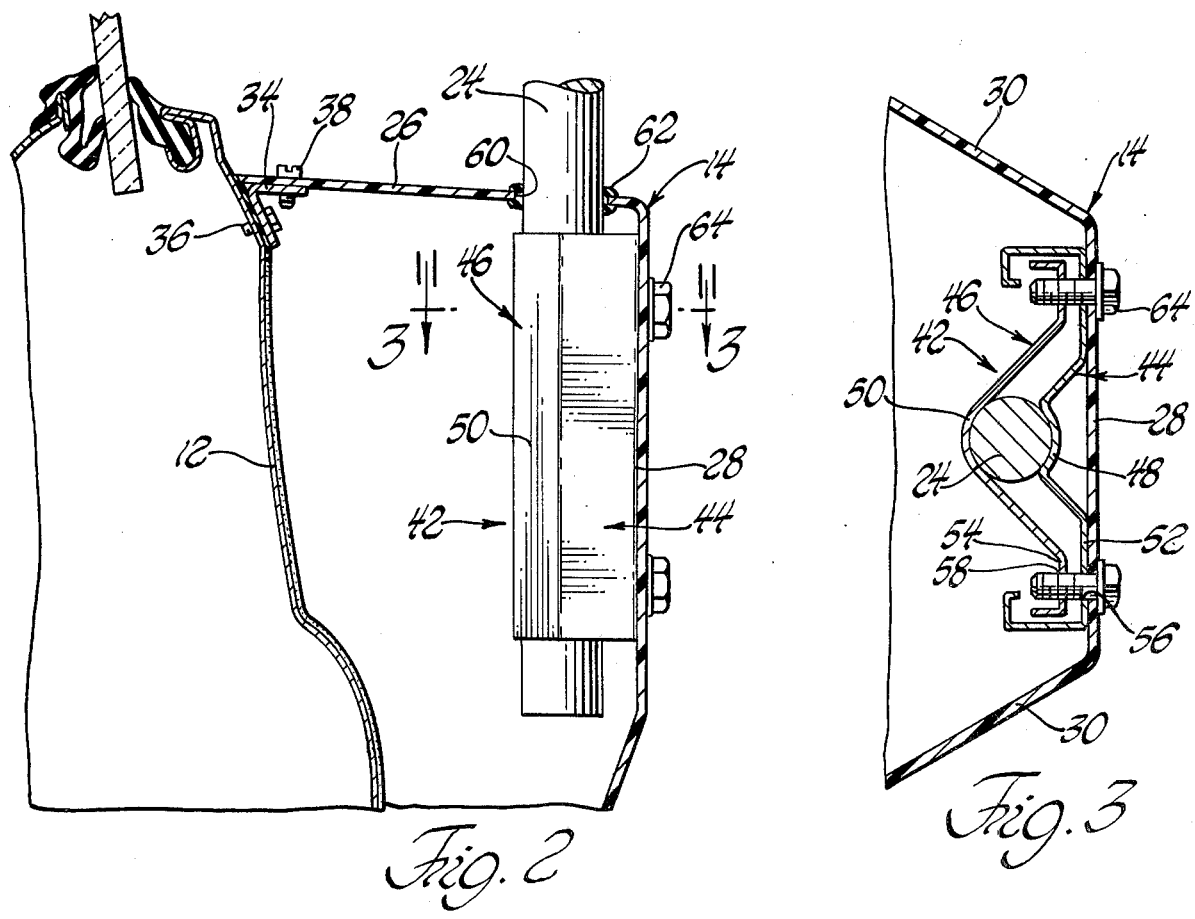

U.S. Patent  Sept. 21, 1976  Sheet 2 of 2  3,981,474
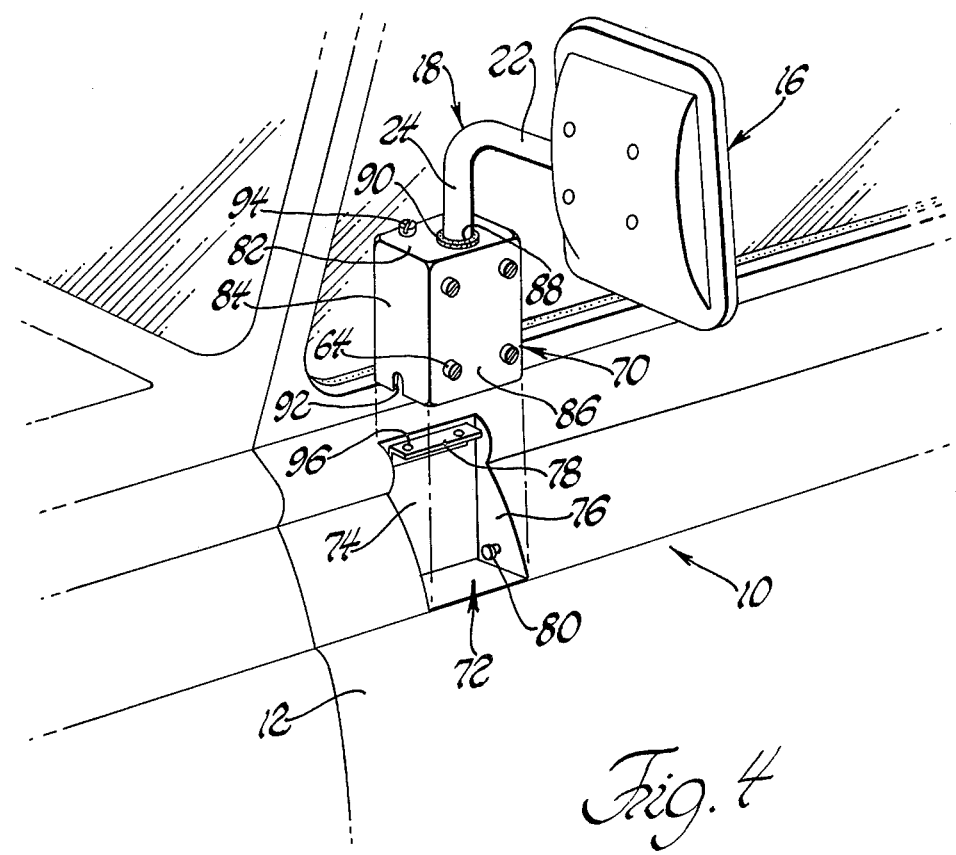
Fig. 4
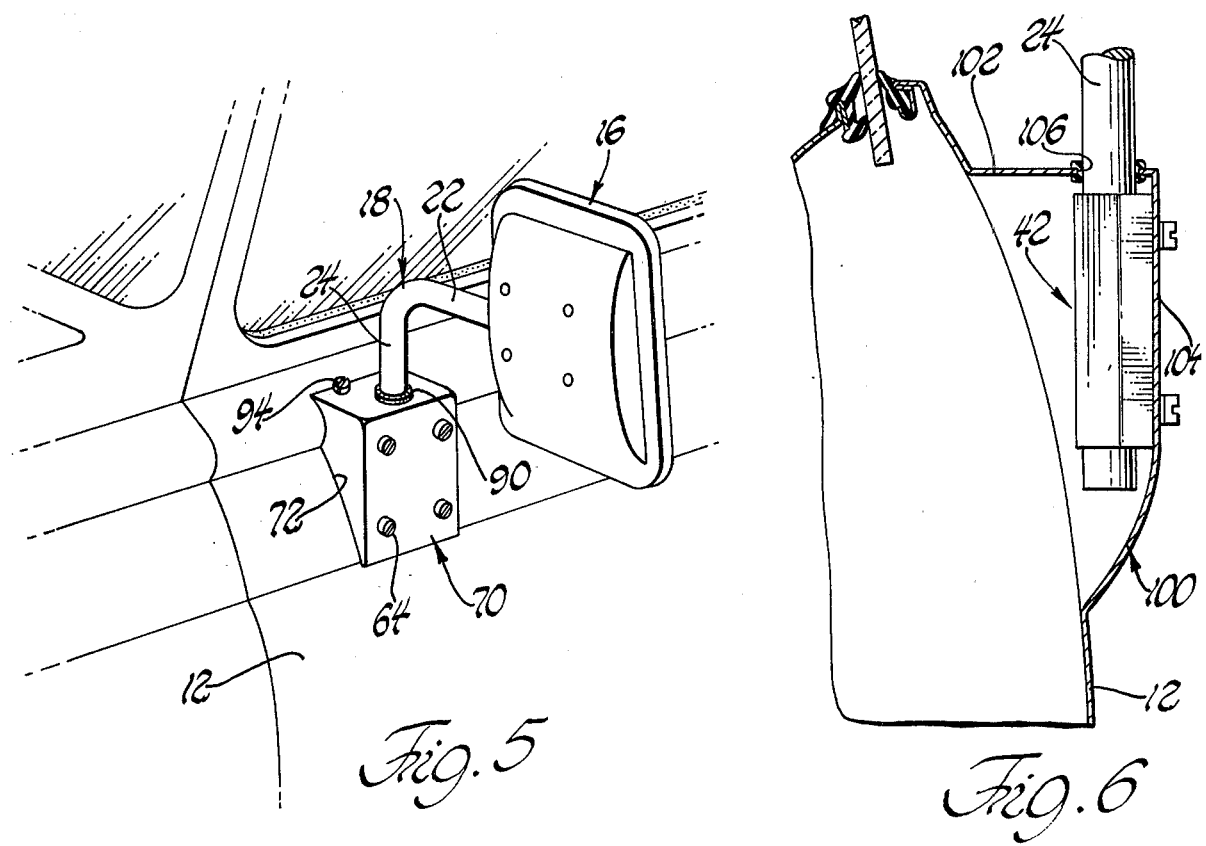
Fig. 5
Fig. 6

MIRROR BRACKET ASSEMBLY

BACKGROUND OF THE INVENTION

1. Field of the Invention

The present invention relates to a mounting structure for an outside type rear view mirror and is particularly relevant to commercial type mirrors of the below-eye-level variety, such as are used with recreational vehicles or trucks. Since trucks and recreational vehicles require large rear viewing mirror surfaces, particularly as compared with passenger vehicles, the mirror heads are large and relatively heavy. As a consequence of the size of such mirror heads, vibration and resultant blurred rear vision is a common problem. Typically, such mirrors are mounted on tubular support structures as shown in U.S. Pat. No. 3,667,718 Goslin wherein the mirror is cantilever-supported at a single point. In another type of heavy duty mirror, such as typified by U.S. Pat. No. 3,730,474 Bowers, the cantilever type support structure is avoided by providing an enclosing tubular frame which supports both the upper and lower ends of the mirror.

In any event, tubular type mirror support structures, and particularly the cantilever-supported types, have a tendency to vibrate and thus blur rear vision. The tubular support structures have the further disadvantage of generating substantial wind noise at high speeds.

It is the purpose of the present invention to provide a rigid enclosed mirror support structure which may be disposed exteriorly of the vehicle and which supports the mirror head for reduced vibration and wind noise.

2. Description of the Prior Art

Applicant is unaware of any prior art teaching of heavy duty type below-eye-level mirror capable of cantilever support and which utilizes a rigid monolithic mirror head support structure.

SUMMARY OF THE INVENTION

The present invention is directed to an outside rear view mirror assembly of the below-eye-level type and where the mirror head may be cantilever-supported upon a monolithic support structure. More specifically, the invention as illustrated and described includes a mirror head adjustably mounted on a horizontal leg portion of an L-shaped supporting arm and the vertical leg of which arm projects within a monolithic support structure such that said latter leg portion is supported over a substantial part of its length within the structure. The monolithic support structure is, in turn, integrally associated with a portion of the vehicle body so as to present the mirror head in a convenient viewing position for the vehicle operator.

In two modifications of the invention as hereinafter described, the monolithic support structure is integrally attached to the vehicle body portion through suitable fastening means while in the third modification the structure is molded or formed integrally with the body portion in all cases to provide a rigid external support for the mirror head.

Reference is now made to the drawings and the following description wherein the invention is set forth in detail.

FIG. 1 is a perspective view of a first modification of the invention;

FIG. 2 is a sectional view along line 2—2 of FIG. 1;

FIG. 3 is a sectional view along line 3—3 of FIG. 2;

FIG. 4 is a perspective view of a second modification of the invention with the support structure disassembled from the body portion.

FIG. 5 is a view of the second modification showing the support structure assembled upon the body portion; and FIG. 6 is a sectional elevation of a third modification of the invention.

Referring to FIG. 1, a vehicle is indicated generally at 10 and includes a door 12. In this modification a monolithic housing structure is indicated generally at 14 and to which structure a mirror head 16 is supported through a support arm 18. Mirror head 16 is of a conventional design and includes a casing 20 within which a suitable mirror element, not shown, is mounted for rearward viewing. Supporting arm 18 is L-shaped and includes a horizontally extending leg portion 22 and a vertically depending leg portion 24. A suitable journal bracket means, not shown but of a type similar to that shown at 42 in FIG. 2, is disposed within mirror head housing 20 and coacts with horizontal leg portion 22 to adjustably mount the mirror head on support arm 18. Thus, mirror head 16 is adjustable about the horizontal leg portion 22 to vary the vertical field of vision rearwardly of the vehicle.

Before proceeding with a specific description of the monolithic housing strucure 14, it is to be understood that such structure may be fabricated of any suitable material such as metal or reinforced plastic. If made of metal, the structure may be a stamped or diecast part. In the event the structure is to be made of plastic, it can be formed by any suitable molding process.

In general, housing structure 14 may assume many configurations. However, in designing the housing structure and consistent with maximizing rigidity, it should be as streamlined and as light as possible. Streamlining, of course, reduces aerodynamic drag and wind noise.

In the modification shown in FIGS. 1 and 2, housing structure 14 is mounted entirely exteriorly of door 12. Housing structure 14 includes a generally planar and horizontally extending upper wall 26 and an outer vertically depending wall portion 28. Structure 14 includes remaining wall portions 30 and 32.

The distance structure 14 extends or projects laterally from door 12 depends on the type of mirror function desired. In the modification of FIG. 1, the housing structure 14 projects laterally of the vehicle a sufficient distance to permit the mirror head 16 to be rotated with arm 18 to inboard and outboard viewing positions. As shown in FIG. 1, the mirror head is in an outboard viewing position and enables the mirror to have its rearward field of vision disposed outwardly of a cargo carried on the rear of the vehicle. To move the mirror to an inboard position, support arm 18 is rotated approximately through 180° from the position shown in FIG. 1, after which the mirror head is rotated through approximately 180° about horizontal leg portion 22 whereby the mirror is now disposed in its inboard rear viewing position wherein cargo no longer disrupts rearward vision.

In the modification of FIG. 2, mirror head 16 does not have both "inboard" and "outboard" positions but rather has the basic position shown from which horizontal and vertical adjustments may be made to suit an individual driver. In the modification of FIG. 2, mirror head 16 and support arm 18 may be rotated to a nonviewing or storage position wherein they are rotated inwardly against the vehicle body.

Returning to the details of FIGS. 1 through 3, it will be noted that the monolithic housing structure 14 is suitably contoured at the inner edges of side walls 30 to conform to the door outline so as to be snugly mountable thereagainst. If required, a sealing element 33 may be disposed between structure 14 and door 12.

As shown in the broken away section of FIG. 1, an angled bracket element 34 is secured to door 12 through suitable screw elements 36. When mounting structure 14 is positioned against door 12, bracket element 34 projects therewithin whereby the structure may be fastened to bracket 34 through suitable screw members 38.

The lower end of support structure 14 is secured to the door 12 through a suitable screw member 40 which is of the self-tapping type and directly engages a suitable hole, not shown, in the door.

Referring more particularly to FIGS. 2 and 3, a journal bracket assembly is indicated generally at 42 and includes first and second plate members 44 and 46. Plate members 44 and 46 respectively include vertically elongated and oppositely facing concave central portions 48 and 50 as well as laterally extending flange portions 52 and 54 having aligned threaded hole sets 56 and 58 formed therein.

An opening 60 is formed in upper wall 26 of mounting structure 14 and has an elastomeric sealing element 62 mounted therearound. In the assembled relationship shown in FIG. 2, it will be noted that wall opening 60 is vertically spaced from bracket assembly 42 and is coaxially aligned with the common axis of concave portions 48 and 50 of plates 44 and 46. As particularly seen in FIGS. 2 and 3, the concave portions 48 and 50 of plates 44 and 46 coact to provide an elongated journal bearing surface.

Mirror head 16 is mounted on support arm 16 and the latter mounted in bracket assembly 42 before the monolithic housing structure 14 is assembled to door 12. The assembly of arm 18 is achieved as follows. Stud or screw elements 64 are passed through suitable holes formed in vertical wall section 28 and holes 56 in plate member 46 so that the latter is loosely mounted thereover. Next support arm leg portion 24 is inserted through wall opening 60 and positioned against concave portion 48 of plate 44. Plate member flanges 54 are now positioned proximate plate flanges 52 such that concave portion 50 of plate 46 engages vertically depending leg portion 24. Screw elements 64 are now threadedly engaged within holes 58 in plate 46 and tightened sufficiently to clampingly support leg portion 24 to bracket assembly 42. Screws 64 are tightened sufficiently that support arm 14 cannot be inadvertently rotated relative to the bracket assembly but may be rotatably adjusted by the operator applying sufficient rotating force to the mirror head in order to vary the rearward horizontal field of view to suit the operator.

If desired, a suitable stop washer, or the like, may be mounted near the lower end of leg portion 24 which extends below bracket assembly 42 to prevent the support arm from being withdrawn from the support structure 14.

As best seen in FIG. 2, the elastomeric sealing element 62 snugly engages and laterally supports depending leg portion 24 about a peripheral area vertically spaced from bracket assembly 42 the latter supporting said arm over a substantial portion of its length. Thus, support arm 24 is laterally supported over a substantial portion of its length and corresponds in extent generally to the vertical dimension of wall 28 of monolithic support structure 14.

Reference is now made to the modification shown in FIGS. 4 and 5 and wherein like numerals are used to indicate components that are the same as those shown and described in relation to FIGS. 1 through 3. The primary difference in this modification as compared with that of FIGS. 1 and 2 is that a monolithic support structure 70 is partially disposed within a recess 72 formed in door 12. By thus recessing mirror support structure 70 within the door, the amount of exterior protrusion of the structure is reduced for improved streamlining and appearance as well as reducing further the tendency to vibrate by diminishing mass overhang.

In the case of a metal door, recess 70 may be suitably stamped therewithin Should a plastic outer door panel be utilized, then, the recess may be molded therein during the door forming process. In any event, recess 70 includes rear and side wall portions 74 and 76. An angled bracket element 78 is mounted on recess back wall 74 through suitable screw elements while a stud element 80 is mounted on each side wall 76 and projects within recess 72.

Monolithic mirror support structure 70 is generally of a rectilinear configuration and includes an open rear wall, not shown, an upper wall 82, side walls 84, and a generally vertically extending front wall 86. An opening 88 and elastomeric sealing member 90 are provided in upper wall 82 and through which vertically depending leg portion 24 of support arm 14 extends and is clampingly supported within the structure by a bracket assembly, not shown, but which is the same as that shown and described in relation to FIGS. 2 and 3 of the drawings.

Support structure side walls 84 include downwardly opening slots 92 and which slidably engage studs 80 to secure the lower portion of the support structure within the recess. At such time as mounting structure 70 is positioned with slots 92 engaged with studs 80, the upper end of the structure is also positioned within the recess so that angled bracket element 78 projects therewithin and the structure is fastened thereto through suitable screw elements 94 extending through suitable holes in wall 82 and threaded into bracket holes 96.

In the modifications depicted in FIGS. 1 through 5, mirror head 16 and support arm 14 are preassembled to monolithic support structures 14 or 70 before the support structure is secured to the door member 12.

Referring now to FIG. 6, a modification is shown wherein the monolithic mirror support structure 100 is integrally formed in door 12. Again depending upon whether the door is metal or plastic, the monolithic mirror support structure 100 is either stamped or molded in the door wall. Support structure 100 again includes a generally horizontal upper wall 102 and a depending generally vertically extending wall 104. As in the previous modifications, depending leg portion 24 of support arm 14 extends through an opening 106 in horizontal wall 102 and is clampingly supported by the bracket assembly 42 which is in turn fixed to the interior of vertical wall 104.

In this modification, however, bracket assembly 42 is mounted within the mirror supporting structure 100 before an inner door panel, not shown, is put in place or else is removed for assembly purposes. In such case, however, plate members 44 and 46 are only loosely assembled on screws 64 whereby support arm leg portion 24 may be subsequently inserted through opening 106 in upper wall 102 and between the plates which are then subsequently tightened thereon by screws 64 to clampingly support the leg portion within the support structure.

What is claimed is:

1. An outside rear view mirror assembly adapted to be mounted to a body portion of a vehicle, said assembly comprising a mirror head, a support arm including first and second leg portions, and means for adjustably mounting the mirror head upon said first leg portion, a monolithic housing structure integrally associated with said vehicle body portion and projecting exteriorly therefrom, said housing structure including a laterally projecting wall portion and a vertically extending wall portion depending therefrom, first and second coacting journal bearing members mounted on said vertical wall portion internally of the housing structure, an opening in said laterally projecting wall portion and axially aligned with said journal bearing members, the second leg portion of said support arm projecting through said wall opening and clampingly supported between said journal members, and means for adjusting the clamping pressure between said journal members and said second leg portion.

2. An outside rear view mirror assembly adapted to be mounted to a body portion of a vehicle, said assembly comprising a mirror head, a support arm including first and second leg portions, and means for adjustably mounting the mirror head upon said first leg portion, a monolithic housing structure, first bracket means fixed to said body portion, said housing structure enclosing said first bracket means, means for securing the housing structure to said first bracket means, second bracket means mounted interiorly of said housing, said second bracket means including a journal bearing surface having a generally vertically extending axis, an opening formed in one wall of said housing and coaxially aligned with the journal surface axis of said second bracket means, the second leg portion of said support arm projecting through said housing opening and secured to said second bracket means.

3. An outside rear view mirror assembly mounted on a vehicle, said assembly comprising a mirror head, a support arm including first and second leg portions, and means for adjustably mounting the mirror head upon said first leg portion, said vehicle including a body portion, an exteriorly opening recess formed in said body portion, a monolithic housing structure, means mounting said housing structure within said body recess whereby said structure includes a portion projecting exteriorly of said recess, bracket means mounted interiorly of said housing, an opening formed in one wall of said housing and aligned with said bracket means, the second leg portion of said support arm projecting through said housing opening and secured to said bracket means.

4. An outside rear view mirror assembly as set forth in claim 3 wherein said recess includes a pair of side walls extending generally transversely of the vehicle centerline, a stud member mounted on each of said side walls and projecting into said recess, said housing structure including an open side facing said recess and a pair of side walls extending from said open side and parallel to the side walls of said recess, a downwardly opening slot formed in each of said housing side walls and adapted to be respectively engaged with said stud members, said housing mounting means including a bracket element mounted in said recess and projecting within said housing structure and fastening means for securing said housing to said bracket element.

5. An outside rear view mirror assembly adapted to be mounted to a body portion of a vehicle, said assembly comprising a mirror head, a support arm including first and second leg portions, and means for adjustably mounting the mirror head upon said first leg portion, a monolithic housing structure integrally associated with said vehicle body portion and projecting exteriorly therefrom, adjustable clamping means mounted interiorly of said housing and including an elongated journal bearing surface, an opening formed in one wall of said housing, said opening being axially spaced from and coaxially aligned with the journal bearing surface of said bracket means, the second leg portion of said support arm projecting through said housing opening and secured to said bracket means, said housing structure including an elastomeric sealing member surrounding said opening and laterally supporting said vertical leg portion.

6. An outside rear view mirror assembly adapted to be mounted to a vehicle, said assembly comprising a mirror head, a support arm including first and second leg portions, and means for adjustably mounting the mirror head upon said first leg portion, said vehicle including a body panel, a monolithic housing structure integrally formed on said body panel and projecting laterally away from the general contour of said panel, said housing structure opening interiorly of said body panel and including a generally horizontal upper wall and a generally vertical wall depending therefrom, bracket means mounted interiorly on said generally vertical wall, an opening formed in said generally horizontal upper wall and aligned with said bracket means, the second leg portion of said support arm projecting through said opening and clampingly secured to said bracket means.

* * * * *